A. H. KINDLE.
DIRIGIBLE HEADLIGHT FOR AUTOMOBILES.
APPLICATION FILED OCT. 16, 1919.

1,348,425.

Patented Aug. 3, 1920.
2 SHEETS—SHEET 1.

Inventor
A.H. Kindle,
By
Harry H. Semmes
Attorney

A. H. KINDLE.
DIRIGIBLE HEADLIGHT FOR AUTOMOBILES.
APPLICATION FILED OCT. 16, 1919.
1,348,425.
Patented Aug. 3, 1920.
2 SHEETS—SHEET 2.
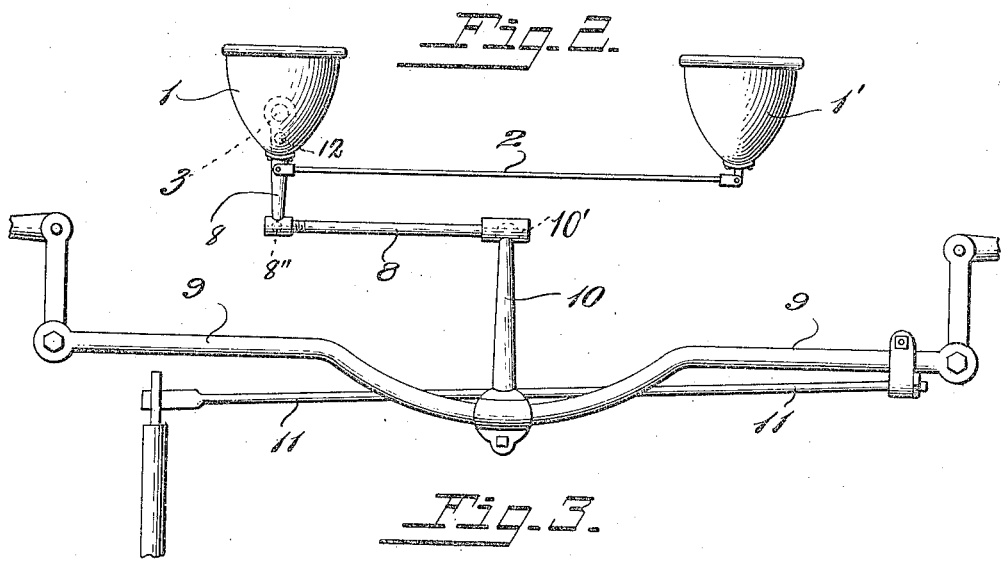
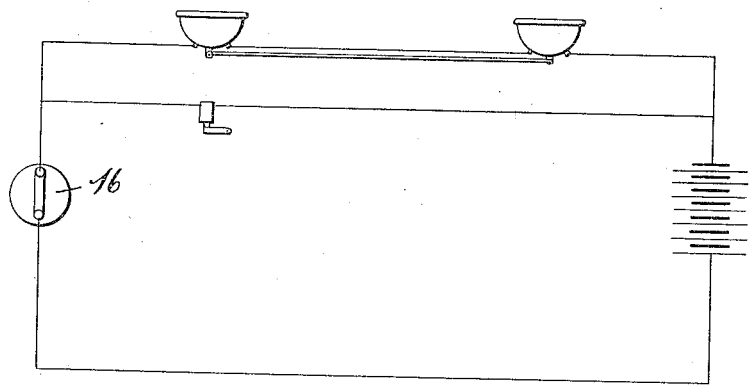
Inventor
A. H. Kindle,
By Harry H. Semmes
Attorney

UNITED STATES PATENT OFFICE.

ANDREW H. KINDLE, OF VERSAILLES, MISSOURI.

DIRIGIBLE HEADLIGHT FOR AUTOMOBILES.

1,348,425.	Specification of Letters Patent.	Patented Aug. 3, 1920.

Application filed October 16, 1919. Serial No. 330,967.

*To all whom it may concern:*

Be it known that I, ANDREW H. KINDLE, a citizen of the United States, residing at Versailles, in the county of Morgan and State of Missouri, have invented certain new and useful Improvements in Dirigible Headlights for Automobiles, of which the following is a specification.

My invention relates to certain new and useful improvements in means for controlling the head lights upon automobiles so that at all times said lights are brought, through the steering gear, under the immediate control of the driver of the car for the purpose of turning them in unison in the line of travel, whether the car be moving straight ahead or more or less upon a curve.

Another object of my invention is to provide a head light for the above purpose which is simple and inexpensive; which is readily connected up with the tie rod or guide rod of the steering gear in use to-day upon any well known automobile chassis, without requiring any great change in its structure.

With these objects in view the invention consists in the novel combination and arrangement of parts as will hereinafter more fully appear, it being understood that changes in the precise embodiment of the device as disclosed in the drawings, may be made within the scope of what is claimed without departing from the spirit of my invention.

The present form of my device as reduced to practice, and now in daily use by me, is illustrated in the drawings accompanying this specification, and throughout the several views thereof, similar reference characters are used to designate corresponding parts.

Fig. 2 is a view looking toward the front of a car, with the lamps connected by the usual bar; said view also shows the intermediate mechanism connecting the spindle of one of the lights with the tie rod, the guide rod and the steering column.

Fig. 3 shows in diagrammatic form, the electric lighting system, commonly in use upon the smaller class of cars.

Figure 1:
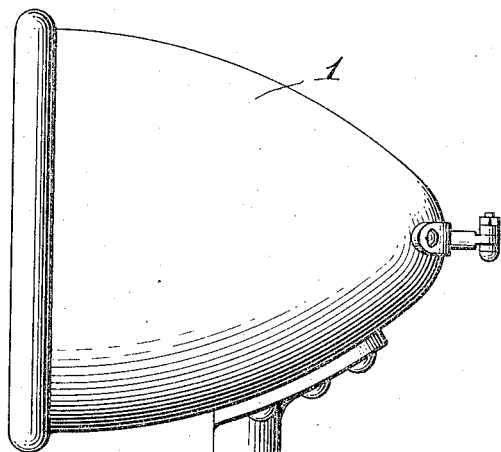
Figure 1 represents a side view of an ordinary automobile lamp, mounted upon its standard or spindle, and showing in cross section the lower end of the spindle and a connecting arm or bar which is intended to be locked with it, through the means of an electromagnet and its armature.
Figure 1:
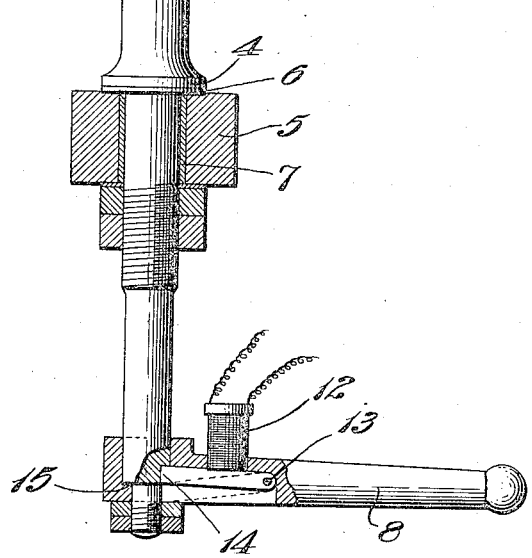

Nos. 1 and 1', Fig. 2, show the ordinary electric lamps mounted in front of a car, and connected together by the bar 2. No. 3, Fig. 1, represents an electric light standard or spindle, having a lamp 1, mounted upon its upper end. At about half its length, the spindle is provided with a shoulder or flange 4, resting upon the cross bar 5 of the chassis, with an interposed washer 6. Mounted in said crossbar 5 is a bushing 7, and an additional washer is provided between the under side of the cross bar and the nut below. The lower end of the spindle rests in a bearing at the end of the bar 8, in which it is constructed easily to revolve; said rod or arm 8 in turn connects with the tie rod 9, (see Fig. 2) through the bar 10, which has a ball and socket 10' and the rod 8' which has a ball and socket joint 8", the tie rod is, in turn, connected with the guide rod 11, and the latter to the usual steering column and steering wheel.

When the guide rod of the steering mechanism is moved so as to change its position relative to the tie rod of the car, through the intermediate mechanism above described, movement may be imparted to the rod 8. When, however, the electric lighting system is not in operation, this movement has no effect upon the lamp spindle, the same loosely revolving in the bearing at the end of the bar 8.

Referring now to Fig. 1, there is found mounted upon said rod 8, and in close proximity to the spindle, an electromagnet 12, in circuit with the electric lamps, the bar or armature of the magnet being pivotally mounted at 13 upon said bar. It will be noted that the lower portion of the spindle is provided with a kerf or slot 14, into which the armature is adapted loosely to fit. This armature has a slight play in a vertical plane, namely from the top of the kerf 14, to a point somewhat below the shoulder 15, as indicated in dotted lines, at which point said armature normally rests.

The operation of my device is as follows: when the electric switch 16, Fig. 3, is turned for the purpose of putting into operation the electric lighting system, the same current which furnishes the light, energizes the electromagnet 12 (see Fig. 1) and the magnet in turn attracts the armature. The spin dle is so constructed and located relative to the armature that as soon as the steering mechanism is moved to straight ahead, the armature slips into the kerf 14 of the spindle and holds it and makes it, through the several intervening connecting rods, a part of the system operated by the steering column and wheel.

From the above it will be apparent that after the electromagnet has drawn the armature into the slot so as to lock the spindle and bar together, and so long as the electromagnet remains energized, it will be impossible to operate the steering mechanism and the front wheels of the car, without at the same time automatically and synchronously moving both electric lamps in unison and in correspondence with said wheels, so as to project the rays of light in the line of travel, whether the vehicle be moving straight ahead or upon more or less of a curve.

What I claim as new and desire to secure by Letters Patent is:

1. In a car, the combination with the steering mechanism, of a dirigible headlight, connections between the headlight and the steering mechanism, said connections embodying a member movable to an operative or an inoperative position, a lighting circuit for the headlight, and means operated upon the closing of the lighting circuit to move said member to its operative position, so that the steering mechanism and the headlight may turn in unison while the headlight is lighted.

2. In a car, the combination with the chassis and the steering mechanism, of a dirigible headlight mounted upon a revoluble spindle, connections between the headlight and the steering mechanism, said connections embodying a member movable to an operative or an inoperative position, a lighting circuit for the headlight, and means operated upon the closing of the lighting circuit to move said member to its operative position, so that the steering mechanism and the headlight may turn in unison while the headlight is lighted.

3. In a car, the combination with the chassis and the steering mechanism, of a dirigible headlight mounted upon a revoluble spindle, connections between the headlight and the steering mechanism, said connections embodying an electromagnet whose armature is movable to an operative or inoperative position, a lighting circuit for the headlight, and means operated upon the closing of the lighting circuit to automatically move said armature to its operative position so that the steering mechanism and the headlight may turn in unison when the headlight is lighted.

4. In a car, the combination of an electric lighting system, a dirigible headlight mounted upon a revoluble spindle having a slot near its lower end, steering mechanism, and an electromagnet mounted upon a connecting bar of the steering mechanism, the armature of which magnet is adapted to be engaged in the slot of the spindle, of electrically operated means to lock the steering mechanism and the headlight when the lighting system is in operation.

5. In a car, the combination of an electric lighting system, a dirigible headlight mounted upon a spindle located upon the front cross-bar of the chassis, said spindle having a slot near its lower end, steering mechanism and running gear, and an electromagnet mounted upon a connecting bar of the steering mechanism in close proximity to the spindle, the armature of which magnet is adapted to be engaged in the slot of the spindle, of electrically operated means to lock the steering mechanism, the headlight and the running gear when the lighting system is in operation.

In testimony whereof I affix my signature.

ANDREW H. KINDLE.